United States Patent
Choi et al.

(10) Patent No.: US 11,346,455 B2
(45) Date of Patent: May 31, 2022

(54) VENT VALVE FOR CLOSED TANK

(71) Applicants: HYUNDAI MOTOR COMPANY, Seoul (KR); KIA MOTORS CORPORATION, Seoul (KR)

(72) Inventors: Seung Hoon Choi, Seoul (KR); June Young Park, Hwaseong-si (KR); Jun Sik Lim, Bucheon-si (KR); Tae Yoon Lee, Seoul (KR); Sung Won Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 240 days.

(21) Appl. No.: 16/699,965

(22) Filed: Dec. 2, 2019

(65) Prior Publication Data

US 2020/0370459 A1    Nov. 26, 2020

(30) Foreign Application Priority Data

May 22, 2019    (KR) .................. 10-2019-0059962

(51) Int. Cl.
*F16K 24/04*    (2006.01)
*B65D 51/16*    (2006.01)
*B65D 81/26*    (2006.01)

(52) U.S. Cl.
CPC ......... *F16K 24/04* (2013.01); *B65D 51/1644* (2013.01); *B65D 81/263* (2013.01); *B65D 2205/02* (2013.01)

(58) Field of Classification Search
CPC ............ B65D 51/1644; B65D 51/1611; B65D 81/263; B65D 2205/02
USPC ........................................ 220/745
See application file for complete search history.

(56) References Cited

U.S. PATENT DOCUMENTS 3,128,899 A * 4/1964 Runo ............... F16K 24/04
220/374

FOREIGN PATENT DOCUMENTS

CN     105932359 A  *  9/2016
DE       9112555 U1 * 12/1991 ............. F16H 57/04

OTHER PUBLICATIONS

Translated Frank reference (DE-9112555) as a PDF (Year: 2021).*

* cited by examiner

*Primary Examiner* — Ernesto A Grano
*Assistant Examiner* — Elisabeth Sullivan
(74) *Attorney, Agent, or Firm* — Morgan, Lewis & Bockius LLP

(57) ABSTRACT

A vent valve for a closed tank, the vent valve being provided in an upper surface of the closed tank storing liquid, may include an upper housing provided with an upper air hole disposed outside the closed tank; a lower housing provided with a lower air hole disposed inside the closed tank; and a valve core provided in a housing space area surrounded by the upper housing and the lower housing and providing a ventilation path through which only gas passes between the upper air hole and the lower air hole.

13 Claims, 6 Drawing Sheets

VENT VALVE FOR CLOSED TANK

CROSS REFERENCE TO RELATED APPLICATION

The present application claims priority to Korean Patent Application No. 10-2019-0059962, filed May 22, 2019, the entire contents of which is incorporated herein for all purposes by this reference.

BACKGROUND OF THE INVENTION

Field of the Invention

The present invention relates generally to a vent valve for a closed tank and, more particularly, to a vent valve for a closed tank which can ensure desired air permeability of the closed tank.

Description of Related Art

A diesel engine vehicle utilizes a urea water system to purify exhaust gas thereof. The urea water system supplies urea water to a catalytic converter of an engine exhaust system, and the urea water supplied to the catalytic converter reacts with NOx in exhaust gas to reduce NOx to nitrogen and water.

The urea water system is provided with a urea water tank storing urea water. The urea water tank is provided with a vent valve to relieve positive pressure generated in the urea water tank when urea water evaporates in the urea water tank and to relieve negative pressure generated in the urea water tank when urea water is discharged from the urea water tank.

As a conventional vent valve, a membrane valve is used, which is formed of a material having characteristics of passing only air without passing liquid.

However, as the membrane valve is formed of a material with very fine pores due to the characteristics of passing only air so that air passing resistance is excessively generated. Thus, when urea water is injected into the urea water tank, internal pressure of the urea water tank is not relieved, but excessively increases so that urea water may overflow to the outside of the vehicle. Furthermore, the membrane valve utilizes a high-priced material having the characteristics of passing only air without passing liquid so that manufacturing cost increases.

Meanwhile, as urea water evaporates in the urea water tank, a white efflorescence is generated in the urea water tank. Accordingly, when a conventional spring valve is applied to the urea water tank, the white powder remains in a rubber sealing portion which is provided for preventing leakage of liquid, causing a problem that a sealing function of the rubber seal is lost.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vent valve for a closed tank in which desired air permeability of the closed tank may be ensured by applying a predetermined vent structure configured for passing only gas to the vent valve without using a high-priced material that increases manufacturing cost and causes air passing resistance.

In various aspects of the present invention, there is provided a vent valve for a closed tank, the vent valve provided in an upper surface of the closed tank storing liquid includes: an upper housing provided with an upper air hole disposed outside the closed tank; a lower housing provided with a lower air hole disposed inside the closed tank; and a valve core provided in a housing space area surrounded by the upper housing and the lower housing and providing a ventilation path through which only gas passes.

The valve core may include: a tubular partition body disposed in the housing space area with a plurality of core air holes at a side portion of the tubular partition body; and a plurality of horizontal partition walls vertically disposed in an interior of the tubular partition body, wherein a first edge portion, which corresponds to a portion of edges of the horizontal partition walls, may be spaced apart from an internal surface of the tubular partition body at a predetermined distance. A second edge portion, which corresponds to a remaining edge of the horizontal partition wall except for the first edge portion, may be in close contact with the internal surface of the tubular partition body. That is, the valve core may be provided with a ventilation gap between the first edge portion of the horizontal partition wall and the internal surface of the tubular partition body.

The horizontal partition wall may be inclined at a predetermined angle and the first edge portion of the horizontal partition wall may be disposed at a position lower than the second edge portion.

Furthermore, any one of the plurality of horizontal partition walls and another one disposed below the any one thereof may be inclined in different directions from each other, may be inclined in opposite directions to each other.

According to an exemplary embodiment of the present invention, the vent valve can ensure desired air permeability of the closed tank through the predetermined vent structure configured for selectively passing only gas. Accordingly, the vent valve of the present invention does not require a high-priced material used in the conventional vent valve, and thus it is possible to reduce manufacturing cost.

Furthermore, as the air passing resistance is reduced compared to the conventional vent valve, the vent valve of the present invention can efficiently relieve internal pressure of the urea water tank when urea water is injected into the urea water tank. Accordingly, it is possible to prevent overflow of urea water to the outside of a vehicle, which may occur when urea water is injected into the urea water tank.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
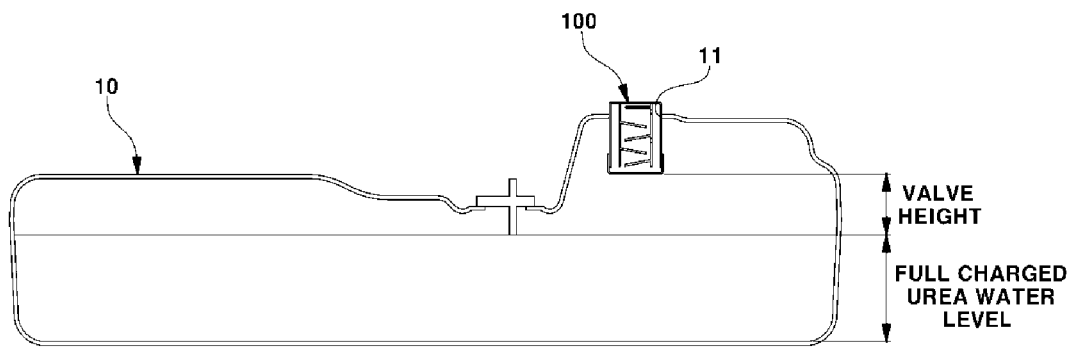
FIG. 1 is a view showing a urea tank provided with a vent valve according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described in detail with reference to the accompanying drawings such that the present invention may be easily embodied by one of ordinary skill in the art to which the present invention belongs.

FIG. 1 is a view showing a urea tank 10 provided with a vent valve 100. The urea tank 10 is a closed tank storing urea water using for reducing exhaust gas of a vehicle. The urea tank 10 maintains a closed state to prevent urea water from flowing out of the urea tank 10.

When urea water evaporates in the urea tank 10, the vent valve 100 may relieve positive pressure generated in the urea tank 10. When urea water is discharged from the urea tank 10, the vent valve 100 may relieve negative pressure generated in the urea tank 10.

The vent valve 100 is configured to allow only urea water in only gaseous state to pass without passing urea water in liquid state.

Figure 2:
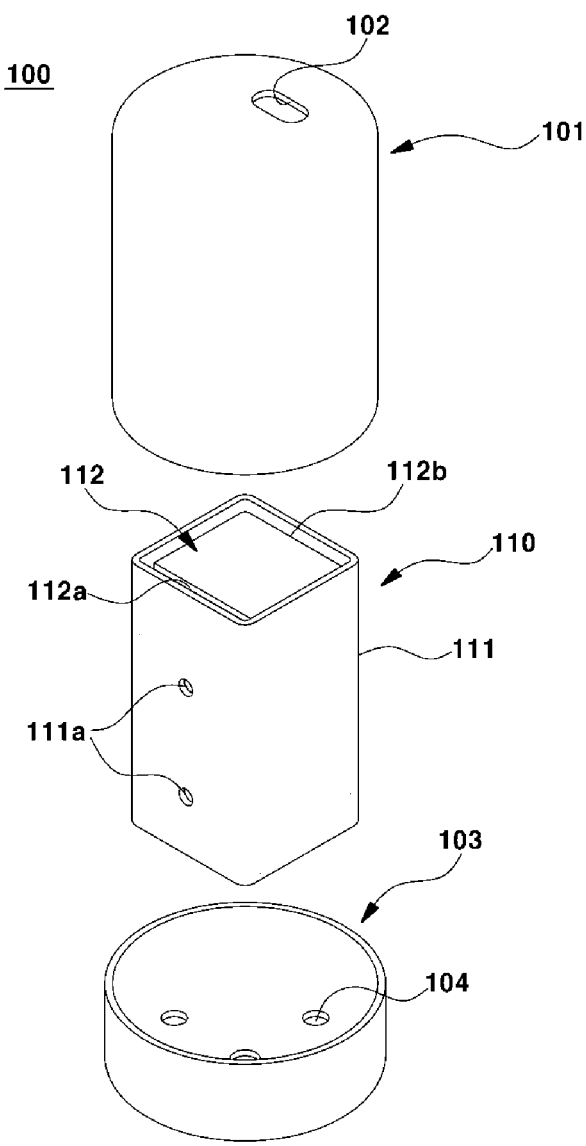
FIG. 2 is an exploded perspective view showing the vent valve according to an exemplary embodiment of the present invention.
Figure 3:
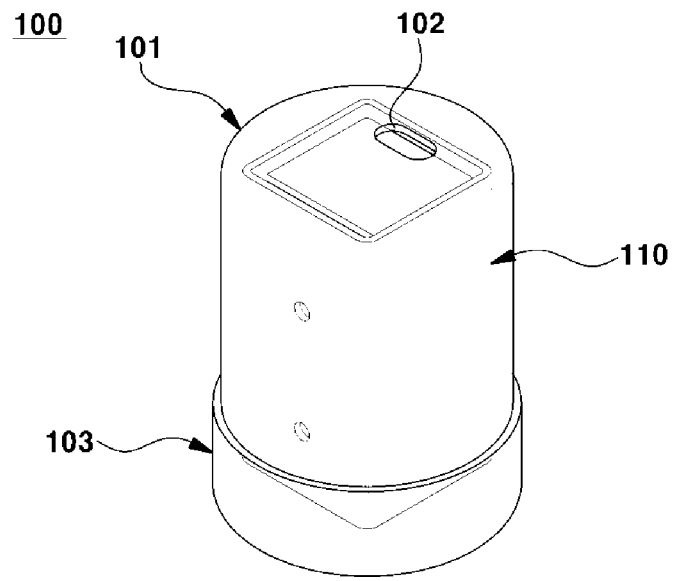
FIG. 3 is an assembled perspective view showing the vent valve according to an exemplary embodiment of the present invention.
Figure 4:
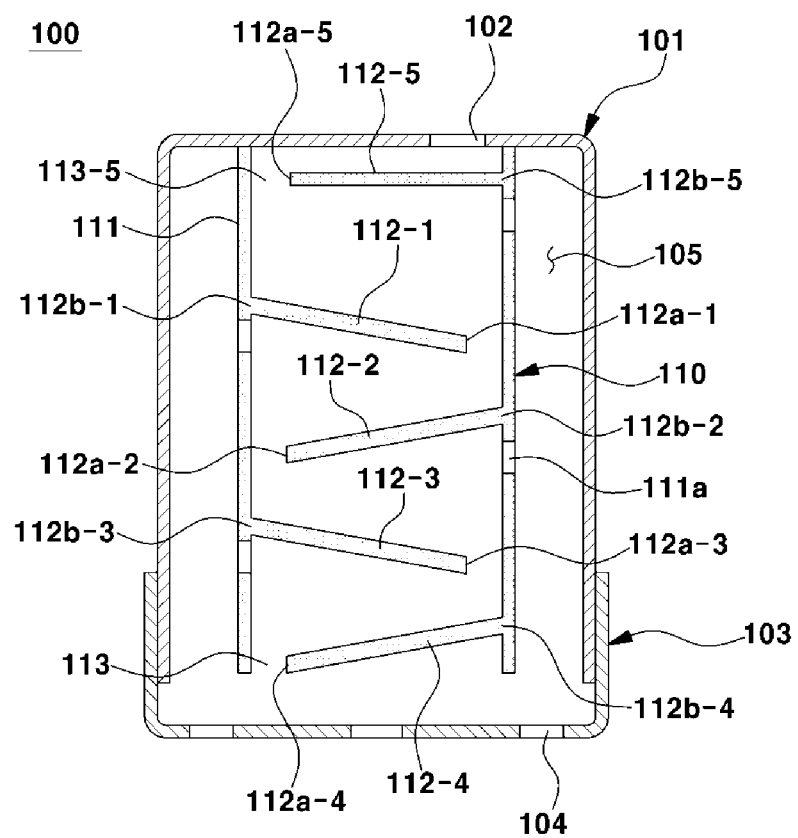
FIG. 4 is a sectional view showing the vent valve according to an exemplary embodiment of the present invention.

As shown in FIG. 2, FIG. 3 and FIG. 4, the vent valve 100 may include an upper housing 101, a lower housing 103, and a valve core 110, and be mounted in an upper surface of the urea tank 10. The upper surface of the urea tank 10 may be provided with a mounting hole 11 in which the vent valve 100 is inserted.

The upper housing 101 may be configured as a cylindrical structure having an open lower surface. The upper housing 101 may be provided with an upper air hole 102 at an upper surface thereof. When the upper housing 101 is disposed in the mounting hole 11 of the urea tank 10, the upper air hole 102 is disposed outside the urea tank 10. When the upper housing 101 is fixed to the mounting hole 11 while being inserted therein, an upper side portion of the upper housing 101 may protrude upwards from the upper surface of the urea tank 10. The upper housing 101 may be formed of plastic, and may be in hermetical close contact with a surface of the mounting hole 11 by being pressed into the mounting hole 11 or joined to the mounting hole 11. The upper housing 101 may prevent urea water flowing into the urea tank 10 from directly entering the valve core 110.

The lower housing 103 may be configured as a cylindrical structure having an open upper surface. An internal diameter of the lower housing 103 may be the same as an external diameter of the upper housing 101. The lower housing 103 may be coupled to a lower side portion of the upper housing 101. The lower side portion of the upper housing 101 may be pressed into the lower housing 103 and fixed thereto. The lower housing 103 may be mounted in the interior of the urea tank 10 while being attached to the lower side portion of the upper housing 101. The lower housing 103 may be provided with at least one lower air hole 104 at a bottom surface thereof, and the lower air hole 104 is disposed in the urea tank 10. The bottom surface of the lower housing 103 may be disposed at a predetermined height from a water surface of the urea tank 10 when fully charged. The lower housing 103 may be formed of plastic, and prevent urea water flowing inside the urea tank 10 from directly entering the valve core 110.

In FIG. 1, the vent valve 100 is mounted to the urea tank 10 by fixing the upper housing 101 to the mounting hole 11, but it is possible that the lower housing 103 is fixed to the mounting hole 11. That is, any one of the upper housing 101 and the lower housing 103 may be hermetically inserted into the mounting hole 11 and fixed thereto. The upper housing 101 and the lower housing 103 provide an area (that is, a housing space area) therein, and a fluid may flow into or pass through the area through the upper air hole 102 and the lower air hole 104.

The valve core 110 may be mounted in the housing space area 105 and provide a ventilation path between the upper air hole 102 and the lower air hole 104, the ventilation path allowing only gas to pass. The valve core 110 may be configured for a tubular partition body 111 mounted in the housing space area 105 and a plurality of horizontal partition walls 112 vertically mounted in the interior of the tubular partition body 111.

The tubular partition body 111 may be configured as a polygonal pipe structure in which an upper surface and a lower surface are open. The interior of the tubular partition body 111 may have a cross section such as a polygon or a circle, but the tubular partition body 111 is not limited to the cross section of an inside thereof. As shown in FIG. 2, the tubular partition body 111 may be a square column partition body having a square cross section.

The tubular partition body 111 may be provided with a plurality of core air holes 111a at a side surface (that is, a side wall) thereof. The core air holes 111a may be disposed in a circumferential direction and a height direction (that is, a vertical direction) of the tubular partition body 111. Each of core air holes 111a may be vertically disposed between the horizontal partition walls 112 mounted in the tubular partition body 111.

The horizontal partition walls 112 divide the interior of the tubular partition body 111 into a plurality of spaces to provide the ventilation path which is bent several times between the upper air hole 102 and the lower air hole 104. As shown in FIG. 2, FIG. 3 and FIG. 4, each of the horizontal partition walls 112 may be configured as a square plate structure having a predetermined thickness. An edge portion of the horizontal partition wall 112 may be fixed to an internal surface of the tubular partition body 111 by being joined thereto. Furthermore, the horizontal partition wall 112 may be integrally molded to the tubular partition body 111. The tubular partition body 111 and the horizontal partition wall 112 may be molded with plastic.

To provide the ventilation path, a predetermined gap (that is, a ventilation gap) may be provided between the edge portion of the horizontal partition wall 112 and the internal surface of the tubular partition body 111. A portion (that is, a first edge portion) of edges of the horizontal partition wall 112 may be disposed by being spaced from the internal surface of the tubular partition body 111 at a predetermined distance to provide the ventilation gap 113. Except for the first edge portion 112a, the remaining portion (that is, a second edge portion) of the edges of the horizontal partition wall 112 may be disposed in close contact with the internal surface of the tubular partition body 111. A width of the horizontal partition wall 112 may be less than a width of the interior of the tubular partition body 111, and each of the horizontal partition walls 112 may be disposed in the interior of the tubular partition body 111 in a transverse direction thereof.

In the tubular partition body 111, a first edge portion of any one of the plurality of horizontal partition walls 112 and a first edge portion of another one disposed below the any one thereof are disposed at different positions based on circumferential directions of the tubular partition body 111 and the horizontal partition wall 112.

For example, in FIG. 4, the plurality of horizontal partition walls 112 may be configured for a horizontal partition wall (that is, a top horizontal partition wall 112-5) which is mounted on the top portion in the tubular partition body 111 and first, second, third, and fourth horizontal partition walls 112-1, 112-2, 112-3, and 112-4 that are mounted below the top horizontal partition wall 112-5 in order. A first edge portion 112a-5 of the top horizontal partition wall 112-5 may be mounted at a left side of the tubular partition body 111. A first edge portion 112a-1 of the first horizontal partition wall 112-1 mounted below the top horizontal partition wall 112-5 may be mounted at a right side of the tubular partition body 111. Furthermore, a first edge portion 112a-2 of the second horizontal partition wall 112-2 mounted below the first horizontal partition wall 112-1 may be mounted at the left side of the tubular partition body 111. A first edge portion 112a-3 of the third horizontal partition wall 112-3 mounted below the second horizontal partition wall 112-2 may be mounted at the right side of the tubular partition body 111. A first edge portion 112a-4 of the fourth horizontal partition wall 112-4 mounted below the third horizontal partition wall 112-3 may be mounted at the left side of the tubular partition body 111. That is, first edge portions 112a of the horizontal partition walls 112 may be alternately mounted on both left and right sides of the tubular partition body 111. As the first edge portions 112a of the horizontal partition walls 112 are alternately mounted from side to side, fluid passing through the interior of the tubular partition body 111 may flow in an S-shape roughly.

Since the horizontal partition walls 112 are mounted in the tubular partition body 111 as described above, the ventilation path extends between the upper air hole 102 and the lower air hole 104 and is formed in a complicated curved shape which is bent in various directions several times. Accordingly, internal gas and external air of the urea tank 10 can pass through the valve core 110, and urea water which flows into the valve core 110 from the interior of the urea tank 10 may be recovered back into the urea tank 10 by gravity.

To more efficiently recover the urea water flowing into the valve core 110 to the urea tank 10, the horizontal partition walls 112 may be mounted in an inclined manner at a predetermined angle in the tubular partition body 111. By arranging the horizontal partition walls 112 in the inclined manner, the urea water flowing into the valve core 110 flows down along upper surfaces of the horizontal partition walls 112, and is discharged to the urea tank 10 through the lower air hole 104. For this, when the horizontal partition wall 112 is mounted in the tubular partition body 111 in the inclined manner, the first edge portion 112a of the edge portions of the horizontal partition wall 112 may be mounted at a lowest position. That is, the first edge portion 112a of each of the horizontal partition walls 112 may be mounted at a position lower than the second edge portion 112b mounted on the opposite side of the first edge portion 112a. In other words, the horizontal partition walls 112 may be alternately mounted at the left and right sides of the tubular partition body 111 in the inclined manner. That is, among the horizontal partition walls 112 of the valve core 110, horizontal partition walls 112 which are closest to each other in a vertical direction may be inclined in opposite directions to each other. In addition, among the horizontal partition walls 112, the top horizontal partition wall 112-5 may be horizontally mounted without being inclined.

Furthermore, the upper air hole 102 may be disposed at the opposite side of the first edge portion 112a-5 of the top horizontal partition wall 112-5. That is, the upper air hole 102 may be disposed above the first edge portion 112a-1 of the first horizontal partition wall 112-1. In other words, the upper air hole 102 may be disposed on the same vertical line as the first edge portion 112a-1 of the first horizontal partition wall 112-1 and the first edge portion 112a-3 of the third horizontal partition wall 112-3. Thus, the ventilation path of the valve core 110 is configured to detour the first edge portion 112a-5 of the top horizontal partition wall 112-5 to communicate with the upper air hole 102. Gas passing through the ventilation path turns the first edge portion 112a-5 of the top horizontal partition wall 112-5 and then passes through the upper air hole 102.

When urea water in the urea tank 10 flows into the housing space area 105 of the vent valve 100, the urea water may flow to the outside of the valve core 110, and not the interior of the valve core 110. Accordingly, to prevent the urea water flowing to the outside of the valve core 110 from passing directly through the upper air hole 102 without passing through the ventilation gap 113 of the valve core 110, an upper end portion of the tubular partition body 111 may be in hermetical close contact with an internal surface of the upper housing 101. For example, the upper end portion of the tubular partition body 111 may be attached to the internal surface of the upper housing 101 and fixed thereto. Furthermore, to smoothly recover urea water flowing into the housing space area 105 back into the urea tank 10, a lower end portion of the tubular partition body 111 may be mounted at a predetermined distance from an internal surface of the lower housing 103.

As shown in FIG. 1, the vent valve 100 configured as described above is mounted to the urea tank 10 in a structure in which the vent valve 100 is mounted higher than a full charged water surface of the urea tank 10 to ensure desired air permeability at all times.

Figure 5:
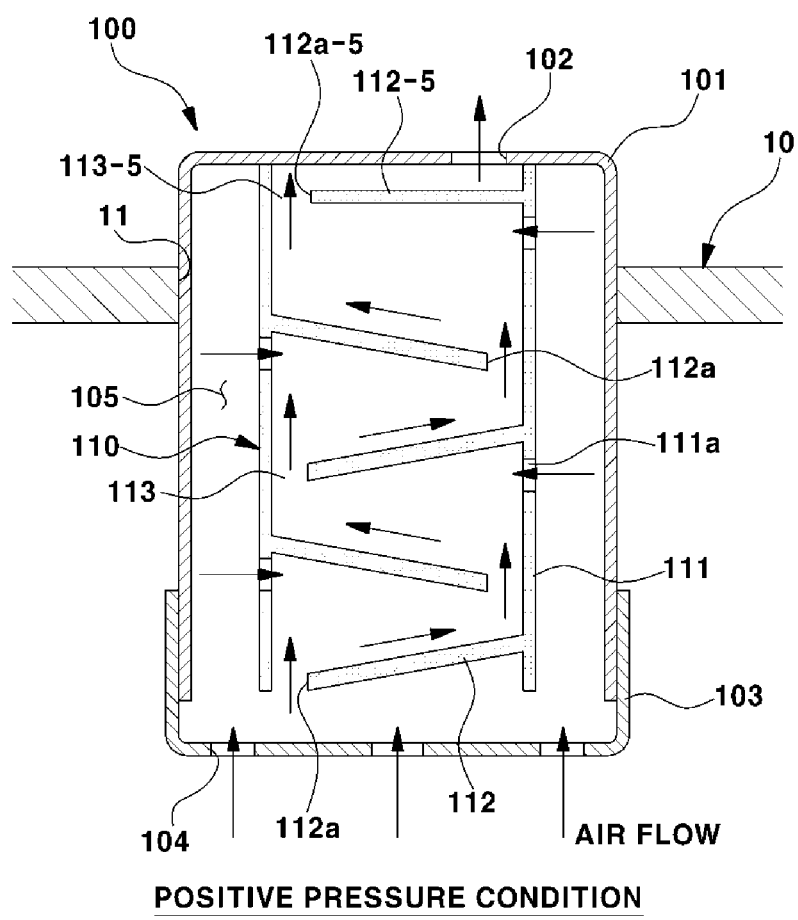
FIG. 5 is a view showing an example of air flow in a condition of generating positive pressure in the urea tank.

As shown in FIG. 5, when internal pressure of the urea tank 10 increases due to evaporation of urea water in the urea tank 10, the vent valve 100 may partially discharge the internal pressure of the urea tank 10 to relieve excess pressure of the urea tank 10. Internal gas in the urea tank 10, which flows into the vent valve 100 through the lower air hole 104, may flow into the valve core 110 through the core air hole 111a and the ventilation gap 113 of the valve core 110, and then be discharged to the outside of the urea tank 10 by passing through the upper air hole 102.

Figure 6:
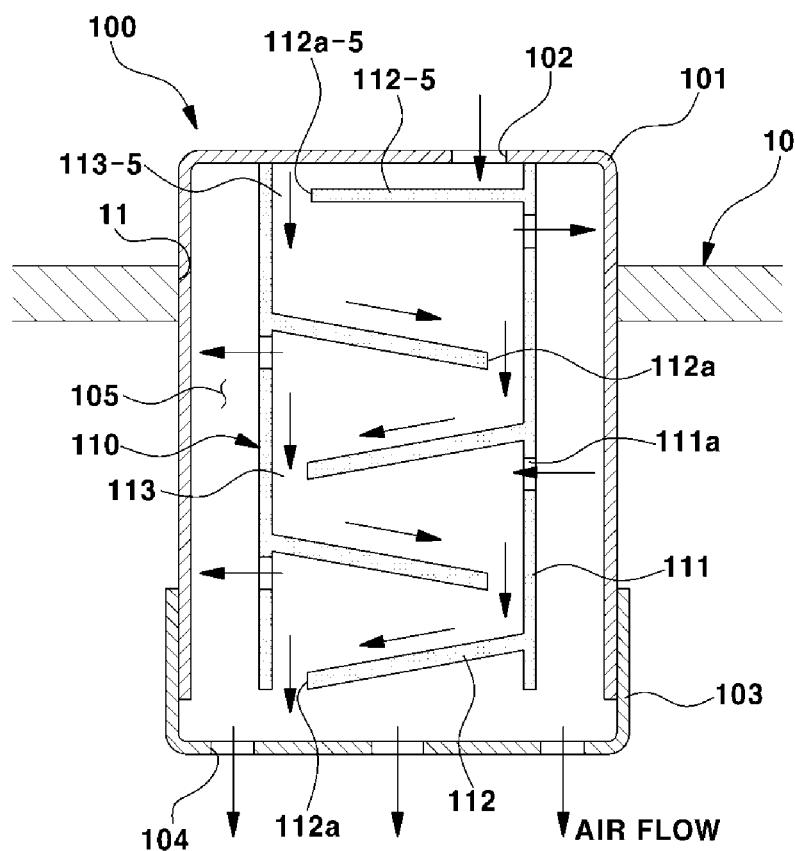
FIG. 6 is a view showing an example of air flow in a condition of generating negative pressure in the urea tank.

As shown in FIG. 6, when urea water is discharged from the urea tank 10 to an engine exhaust system, the vent valve 100 may introduce external air into the urea tank 10. The external air introduced into the vent valve 100 through the upper air hole 102 may pass through a ventilation gap 113-5 between the top horizontal partition wall 112-5 and the tubular partition body 111, and enter the interior of the tubular partition body 111. Accordingly, the external air entering the interior of the tubular partition body 111 may pass through the ventilation gap 113 between the tubular partition body 111 and the horizontal partition wall 112 and through the core air hole 111a, and then reach the lower air hole 104. The external air may flow into the interior of the urea tank 10 through the lower air hole 104.

As described above, positive pressure and negative pressure generated in the urea tank 10 are relieved, so that internal pressure of the urea tank 10 can remain constant.

Figure 7:
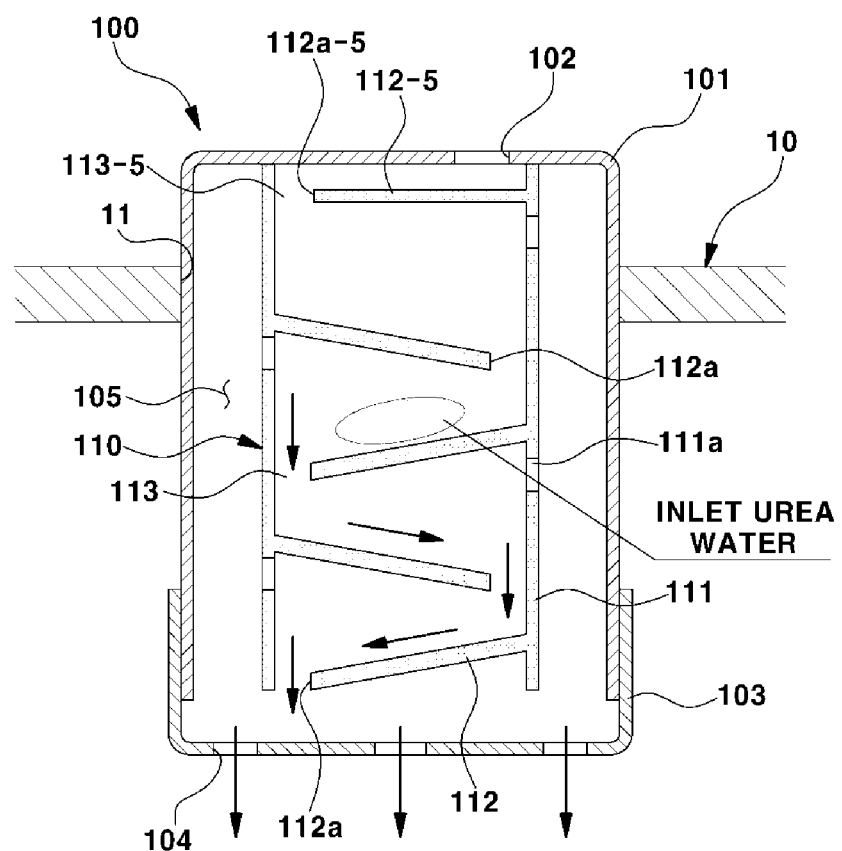
FIG. 7 is a view showing an example of a flow of urea water flowing into the vent valve.

Meanwhile, as the ventilation path of the valve core 110 is configured to be complex and long while being bent from side to side and the horizontal partition wall 112 of the valve core 110 is mounted in the inclined manner, the vent valve 100 can recover urea water flowing into the interior of the valve core 110 back into the interior of the urea tank 10 by gravity (referring to FIG. 7). That is, the urea water flowing into the interior of the valve core 110 loses migration energy before reaching the upper air hole 102, and flows into the interior of the urea tank 10 by gravity. Therefore, the vent valve 100 can prevent urea water in the urea tank 10 from flowing out to the outside, and also prevent the urea water from pooling inside the valve core 110.

Figure 8:
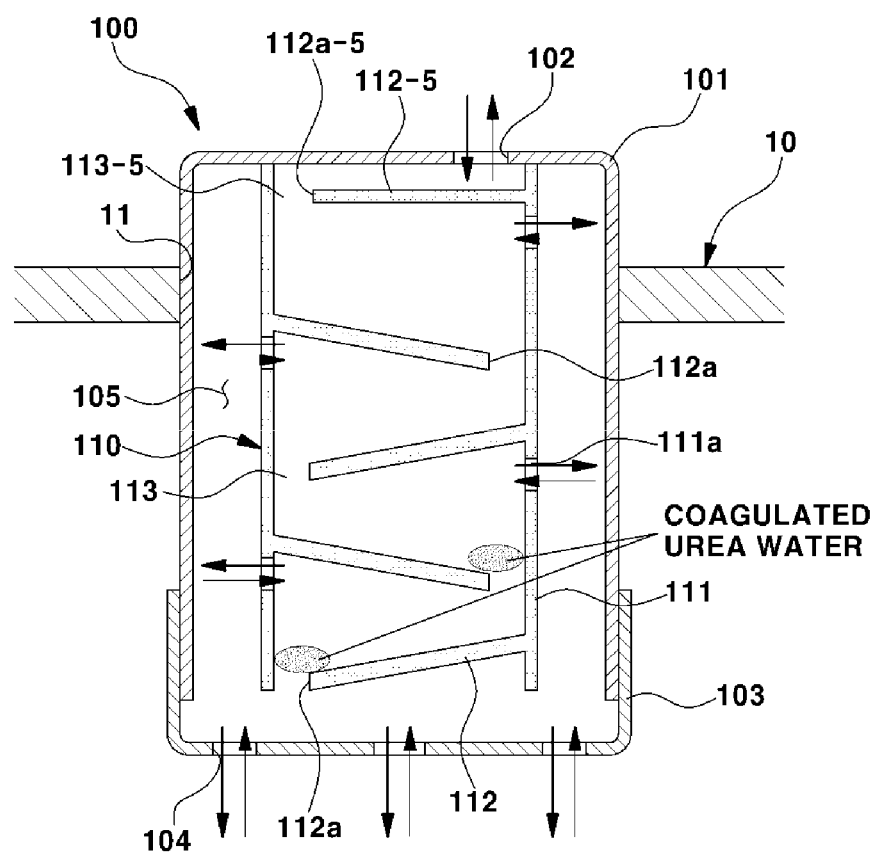
FIG. 8 is a view showing an example of coagulation of the urea water flowing into a valve core.

Furthermore, when a situation occurs in which urea water flowing into the vent valve 100 coagulates, by arranging the horizontal partition wall 112 in the inclined manner, coagulating position of urea water may be guided to a lower side of the horizontal partition wall 112 (referring to FIG. 8). Furthermore, even when ventilation gaps 113 of the valve core 110 are clogged sequentially from the bottom by coagulation of urea water, the core air hole 111a is disposed on an upper side of the first edge portion 112a, so that desired air permeability of the valve core 110 may be secured through the core air hole 111a. Furthermore, coagulated urea water may be dissolved immediately when brought into contact with liquid urea water.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vent valve apparatus for a closed tank, the vent valve apparatus being provided in an upper surface of the closed tank storing liquid, the vent valve apparatus comprising:
   an upper housing provided with an upper air hole disposed outside the closed tank;
   a lower housing provided with a lower air hole disposed inside the closed tank; and
   a valve core provided in a housing space area surrounded by the upper housing and the lower housing and providing a ventilation path through which gas passes between the upper air hole and the lower air hole,
   wherein the valve core includes:
      a tubular partition body mounted in the housing space area with a plurality of core air holes at a side portion of the tubular partition body; and
      a plurality of horizontal partition walls mounted in an interior of the tubular partition body, and
   wherein first edge portions of the plurality of horizontal partition walls are spaced from an internal surface of the tubular partition body at a predetermined distance.

2. The vent valve apparatus of claim 1, wherein the valve core is further provided with a ventilation gap between each first edge portion of the plurality of horizontal partition walls and the internal surface of the tubular partition body.

3. The vent valve apparatus of claim 1, wherein second edge portions of the plurality of horizontal partition walls are in contact with the internal surface of the tubular partition body.

4. The vent valve apparatus of claim 3, wherein adjacent horizontal partition walls among the plurality of horizontal partition walls are inclined at a predetermined angle and each first edge portion of the adjacent horizontal partition walls is mounted at a position lower than each second edge portion of the adjacent horizontal partition walls.

5. The vent valve apparatus of claim 1, wherein the plurality of core air holes is formed between second edge portions of the plurality of horizontal partition walls at the side portion of the tubular partition body.

6. The vent valve apparatus of claim 1, wherein adjacent horizontal partition walls among the plurality of horizontal partition walls are inclined in different directions from each other.

7. The vent valve apparatus of claim 6, wherein the adjacent horizontal partition walls among the plurality of horizontal partition walls are inclined in opposite directions to each other.

8. The vent valve apparatus of claim 1, further including an upper horizontal partition wall mounted above the plurality of horizontal partition walls and a first edge portion of the upper horizontal partition wall and the upper air hole are mounted at different positions based on a circumferential direction of the tubular partition body.

9. The vent valve apparatus of claim 1, wherein an upper end portion of the tubular partition body is in contact with an internal surface of the upper housing.

10. The vent valve apparatus of claim 9, wherein the upper air hole of the upper housing is enclosed by an inner circumference of the tubular partition wall.

11. The vent valve apparatus of claim 9, wherein a lower end portion of the tubular partition body is spaced from a bottom portion of the lower housing at a predetermined distance.

12. The vent valve apparatus of claim 1, wherein a mounting hole is provided in the upper surface of the closed tank, and one of the upper housing and the lower housing is inserted into and fixed to the mounting hole.

13. The vent valve apparatus of claim 1, wherein a bottom surface of the lower housing is mounted in the closed tank at a predetermined height from a liquid surface of the closed tank.

* * * * *